May 1, 1934.　　　　J. H. HARLOW　　　　1,957,043
STEREOSCOPIC CAMERA AND VIEWING DEVICE
Filed July 14, 1933　　　2 Sheets-Sheet 1
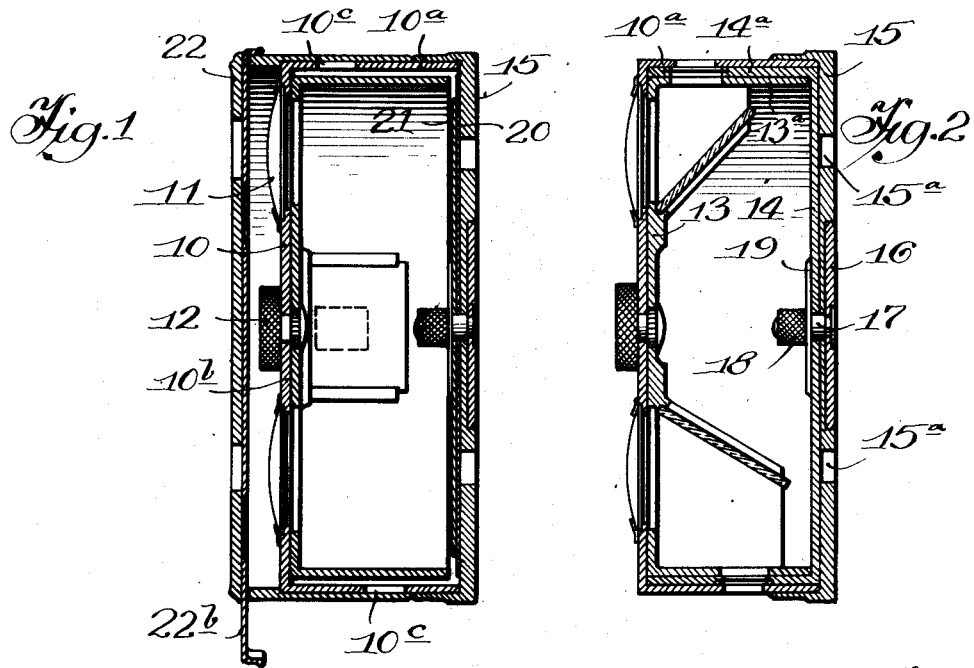
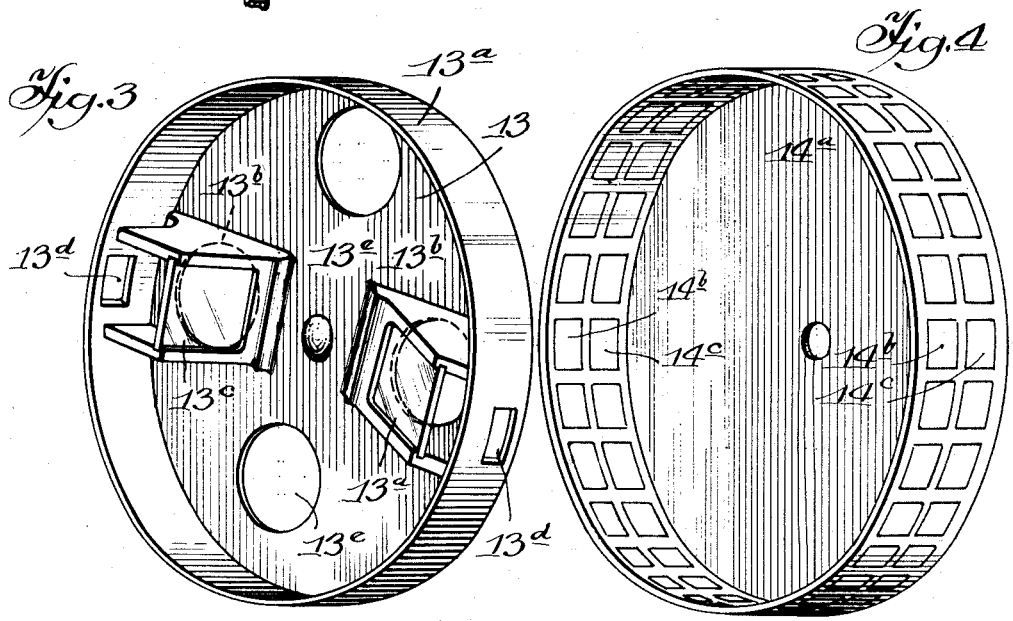
Inventor,
Jesse Hancock Harlow,
Benj. F. Woodhouse Atty.

May 1, 1934.  J. H. HARLOW  1,957,043
STEREOSCOPIC CAMERA AND VIEWING DEVICE
Filed July 14, 1933  2 Sheets-Sheet 2
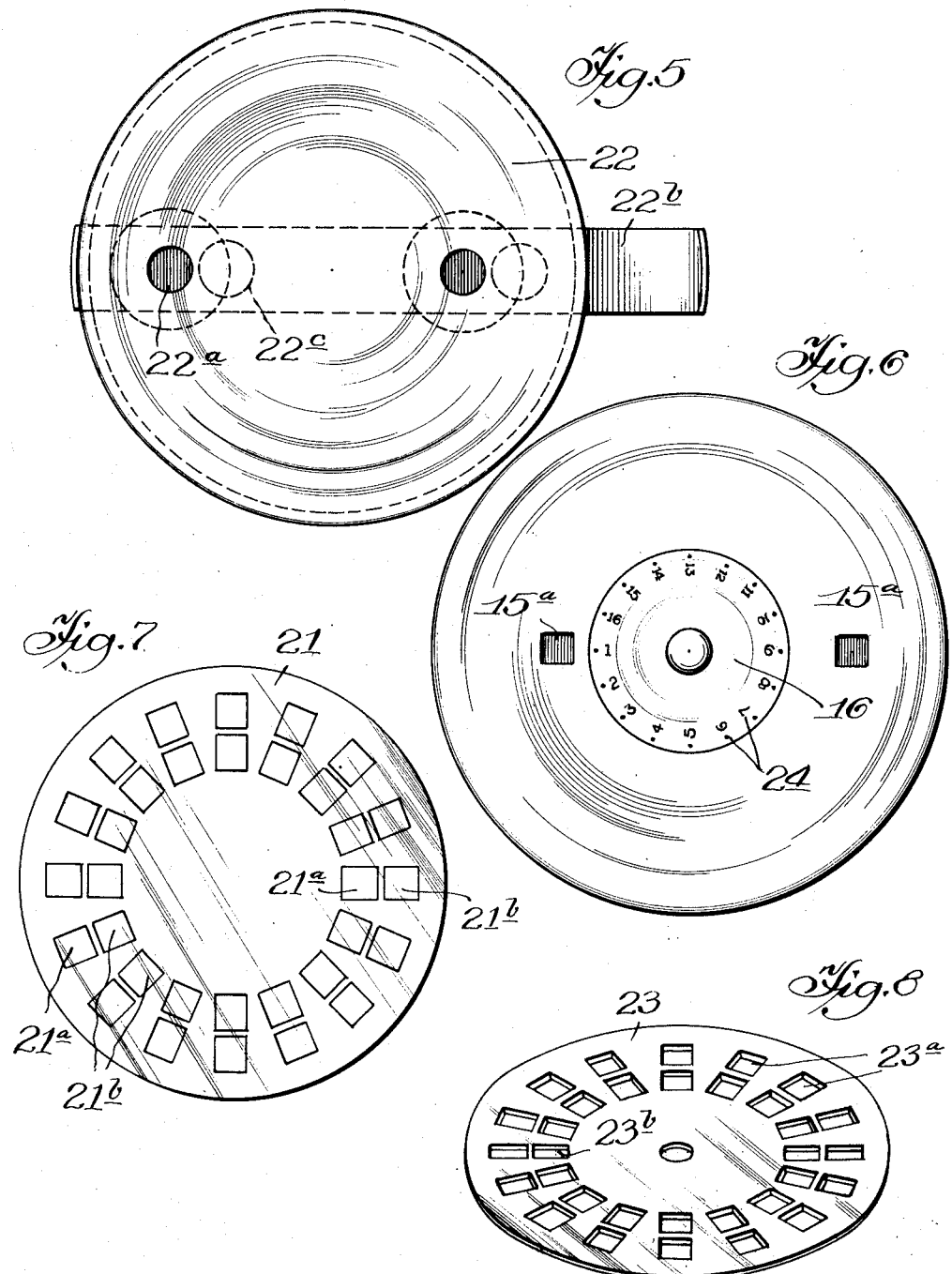

Patented May 1, 1934

1,957,043

UNITED STATES PATENT OFFICE 1,957,043

STEREOSCOPIC CAMERA AND VIEWING DEVICE

Jesse Hancock Harlow, Chicago, Ill.

Application July 14, 1933, Serial No. 680,424

3 Claims. (Cl. 95—18)

My present invention relates to the provision of a stereoscopic camera and means for viewing trans-illuminated positives when set in stereoscopic relation. The most widely known method for securing a plastic or stereoscopic effect in pictures is to take two views of substantially the same object or objects from separated viewpoints and to view positives from such negatives through magnifiers or objectives so arranged that the respective views will appear to the respective eyes through the objectives as viewed from a separation approximately that of the separation of the human eyes.

One of my principal objects is to produce a stereoscopic camera and viewing apparatus of such simple design that it may be made and sold at an attractively moderate price, and a second important object is to provide a stereoscopic camera and viewing device of such a design that it may be made in very small dimensions and at the same time will permit of the taking and viewing of a relatively large number of views.

I have attained the foregoing objects by means of the structure illustrated in the accompanying drawings, in which—

Fig. 1 is a central section of the structure arranged as a camera or for the purpose of taking stereoscopic views.

Fig. 2 is a central section similar to that shown in Fig. 1, except that the shutter element for exposing the films has been removed and the apparatus is arranged for viewing the trans-illuminated positives when arranged in cylindrical relation.

Fig. 3 is a perspective of the apparatus, the adjustment of which permits the taking of pictures or viewing of positives either arranged in cylindrical relation or printed upon a disk of film.

Fig. 4 is a perspective showing the structure for mounting the disposal of the views in cylindrical relation.

Fig. 5 is a front view of the apparatus or more particularly the shutter element of the apparatus for exposing the film when the apparatus is used as a camera.

Fig. 6 is a view of the end of the apparatus in which the lenses or objectives are not mounted.

Fig. 7 is a plan of the arrangement of the views when disposed upon a disk of film.

Fig. 8 is a perspective of means for securing the arrangement of separate views the same as is secured upon a single disk of film.

Similar reference characters refer to similar parts throughout the respective views.

I employ the same lenses or objectives for taking the pictures and viewing the positives.

The feature which permits me to make such a compact structure and to dispose such a number of views in stereoscopic relation is the unequal disposition of the objectives or lenses from the center or axis about which the film is rotated. With such an unequal disposition of the lenses an area under the nearest lens and another area under the remote lens are simultaneously viewable through the lenses on each diameter upon which pictures are taken or positives disposed, and when this diameter has been rotated 180° the lenses are opposite sections which were not viewable through the lenses in the original position of the diameter. These two sets of views upon the same diameter are upside down with relation to each other but are always the same side up with relation to the lenses through which they are taken or seen. The pictures may be taken either upon a strip or ribbon film formed into a cylinder or upon a disk of film, and when the positives are printed they may likewise be either printed upon a strip or ribbon of film and arranged in cylindrical relation or upon a disk of film, or, if desired, mounted upon perforated holders, either in cylindrical or disk relation.

The portion of my apparatus in which the lenses 11 are mounted consists of a suitable length of hollow cylinder 10a, one end whereof is closed by a disk 10b in which disk are provided openings at different distances from the center of the disk in which, or in relation to which, the lenses or objectives 11 are mounted.

Centrally and rotatably mounted in the disk 10b is the milled headed stub shaft 12 so that the milled head thereof is upon the front face of the disk 10b. To the end of the stub shaft 12 which passes through the end disk 10b is fixedly secured the structure most clearly shown in Fig. 3. The structure shown in Fig. 3 consists of the disk 13, the center of which is fixedly secured to the inner end of the stub shaft 12. Extending at right angles from the disk 13 at its periphery is the flange 13a. Upon one diameter of the disk 13 are provided openings 13b which register with the lenses or objectives 11 when the diameter upon which the openings 13b are disposed registers with the diameter passing through the center of the lenses 11. Behind the openings 13b are mounted reflectors 13c inclined at equal angles with the planes of the lenses 11 and with the flange 13a at the ends of the diameter upon which the openings 13b are located. In the flange 13a opposite the reflectors 13c are provided apertures 13d, which apertures are respectively different distances from the disk 13. On the diameter of the disk 13, at 90° with respect to the diameter of the openings 13b, are similar openings 13e, which likewise register with the lenses 11 when the diameter upon which they are disposed registers with the diameter running through the centers of the lenses 11.

In the walls of the cylinder 10a opposite the apertures 13d when the apertures 13b register with the lenses, are provided openings 10c so that when the disk 13 is rotated to secure the registration of the openings 13e with the lenses 11 the openings or apertures 10c are blocked or closed.

As shown in Figs. 1 and 2, the flange 13a is spaced from the cylinder 10a. The spacing between the cylinder 10a and the flange 13a is sufficient to receive the cylindrical flange 14a extending at right angles to the disk 14 of the structure shown in Fig. 4. The flange 14a is provided at each end to each diameter upon which views are disposed with pairs of perforations 14b and 14c at different distances from the plane of the disk 14. When the disk 13 is positioned so that the openings 13d therein register with the openings 10c and a diameter upon which views are disposed opposite the openings 14b and 14c are brought in registry with the openings 13d and 10c a view in opening 14c and another one in 14b at the opposite ends of the diameter will be visible, and when the disk 14 has been rotated 180° the views through the openings 14b and 14c, but at opposite ends of the diameter, will be visible.

The open rear end of the member 10a is closed by the flanged cap 15. Centrally of the cap 15 is a circular recess or depression in which is rotatably mounted a disk 16. Fixedly secured to the disk 16 is a stub bolt 17 which extends through the end wall of the cap and the inner end of which is threaded to receive nut 18. Removably mounted upon the inner threaded end of the stub bolt 17 by means of the washer 19 and nut 18 is the disk 14 so that by rotating the disk 16 the entire member shown in Fig. 4 may be rotated.

The foregoing description has to do with what may be regarded as the cylindrical disposition of the film either for taking the negatives or viewing the positives.

The advantages of the unequal disposition of the lenses or objectives, however, may be retained without employing a cylindric disposition of the film, in which case the structure shown in Fig. 4 is detached from the stub bolt 17 and attached thereto, in place thereof, is a light proof disk 20, as shown in Fig. 1, above which is placed a film disk 21, as shown in Fig. 1, and also in detail in Fig. 7.

When the disk disposition of film, as distinguished from the cylindric disposition of film, is employed the member shown in Fig. 3 is rotated until the openings 13e each are in register with the lenses or objectives 11.

When pictures are to be taken a front cap member 22, as shown in Figs. 1 and 5, is fitted over the front or lens holding end of the cylinder 10a. This front cap member 22 is provided with apertures 22a registering with the lenses 11 and sliding within the cap 22 is a slide 22b having spaced perforations 22c therein, which slide, with its perforations, constitutes a shutter for making exposures upon the film disk 21 by merely pressing the slide 22 from its limit of movement in one direction to its limit of movement in the opposite direction across a diameter of the cap 22.

Having special reference of Fig. 7, the views located in the areas 21a would be exposed by one movement of the shutter, and when the diameter upon which the views located in the areas 21a were exposed is rotated 180° the areas designated 21b would be in position for exposure. As before explained, the views located in the areas 21a and 21b would be upside down with respect to each other but right side up as each passed in front of the lenses.

So as to illuminate these views, registering apertures 15a, as shown in Figs. 2 and 6, are provided in the end wall of the member 15. Of course when positives are to be viewed, the light proof disk 20 is removed.

In printing positives for viewing, the horizontal relation of the pictures must be reversed from their position as negatives. For this reason, and also because it may be found desirable I provide the perforated disk 23, shown in Fig. 8, opposite the perforations 23a, in which disk may be secured, in any desired manner, either film for exposure or printed positives for viewing. Upon the rear face of the disk 16, as shown in Fig. 6, may be placed indicia 24 for the purpose of indicating when film is in position for exposure or when positives are in position for viewing.

Having described my invention what I claim as new and desire to secure by Letters Patent is:

1. In stereoscopic apparatus means for securing the rotation of film about a central axis in combination with a pair of lenses disposed upon opposite sides of and at different distances from said axis of rotation.

2. In stereoscopic apparatus means for securing the rotation of film about a central axis in combination with a pair of lenses disposed upon opposite sides of and at different distances from said axis of rotation, and a pair of reflectors cooperating with said lenses.

3. In stereoscopic apparatus in combination with lenses disposed at different distances from a predetermined axis, means for rotating film about said axis whereby two pairs of views may be disposed diametrically with respect to said axis.

JESSE HANCOCK HARLOW.